April 3, 1951 J. B. WALKER 2,547,186

MAGAZINE

Filed April 30, 1945 3 Sheets-Sheet 1

INVENTOR.
JOSEPH B. WALKER,
BY
Westall & Westall
ATTORNEYS.

April 3, 1951 J. B. WALKER 2,547,186

MAGAZINE

Filed April 30, 1945 3 Sheets-Sheet 2

INVENTOR.
JOSEPH B. WALKER,
BY
Westall & Westall
ATTORNEYS.

April 3, 1951 J. B. WALKER 2,547,186

MAGAZINE

Filed April 30, 1945 3 Sheets-Sheet 3

INVENTOR.
JOSEPH B. WALKER,
BY
Westall & Westall
ATTORNEYS.

Patented Apr. 3, 1951

2,547,186

UNITED STATES PATENT OFFICE 2,547,186

MAGAZINE

Joseph B. Walker, Hollywood, Calif.

Application April 30, 1945, Serial No. 591,135

3 Claims. (Cl. 242—55)

This invention relates to magazines adapted to encase a pair of reels for supporting and moving a steel tape or wire adjacent an opening in the magazine through which a magnetic recording or transcribing unit may be inserted for operative engagement with the recording medium.

Magnetic recording units of the prior art comprise generally a pair of reels, the tape or wire recording medium, carried thereby, being drawn in taut condition from one reel to the other in a flat reach with which a recording head consisting of two or more magnetic pole pieces are engaged. The magnetic poles may be disposed in pairs, both at one side of the medium or on opposite sides, in opposed or staggered relationship depending upon the type of the equipment; but whatever the arrangement in particular units, the adjustment is critical. In a preferred assembly of this character, the tape or wire is removable from the recording unit in order that magnetic records impressed upon other recording media may be transcribed or other records produced. Accordingly, it is desirable that separate reels for each recording medium be provided, and, further, that the tape and reels be adapted for facile assembly as a unit with the recording and transcribing head.

In a unit contemplating the arrangement of the pole pieces of the recording, transcribing or erasing magnets on opposite sides of the tape, guides should be provided for the pole pieces and magnets to assure proper alignment and engagement with the tape in order to avoid injury to the latter and enable the positioning of these parts with facility. As the magnets and their poles are most easily shifted into engagement with the tape from a lateral direction, the tape should be held firm in a plane interposed between the opposed poles as the latter are guided into position.

It is a general object of the present invention to provide a magazine for permanently housing a pair of reels in rotatable relationship, in combination with guide means for a tape carried by and movable from one reel to the other adjacent an opening in the magazine into which pole pieces of a magnetic recording head or heads may be inserted for operative engagement with the tape.

Another and highly important object is the provision of a gate adapted for movable association with the reel casing for the control of the opening in the latter and to encase the reach of tape extending by the opening, in a protective housing while the pole pieces and magnets are out of contact with the tape.

More specifically, it is an object of the present invention to provide means associated with the gate to draw taut the reach of tape projecting adjacent the opening in the casing in a predetermined plane operable coincident with the opening of the gate and preparatory to the reception of the magnetic recording head in operative relationship therewith.

Still another object is to provide trip mechanism actuated by means carried by the recording head unit for releasing the tape retainers from engagement with the tape, incident to placement of the pole pieces in operative relationship with the tape, whereby the latter may be moved freely in contact with the pole pieces in response to the application of power to the take-up reel.

Another object is to provide an auxiliary latching device for the gate to prevent its being closed when the tape is engaged by the gate mechanism, in combination with manually actuated means to release the latch and return the tape-engaging elements of the gate assembly to inoperative position until the gate is again closed, the mechanism being re-set incident to closing the gate.

Numerous other structural features and corresponding advantages will be obvious to those of skill in the art upon an examination of the following description read in the light of the accompanying drawings in which.

Figure 1:
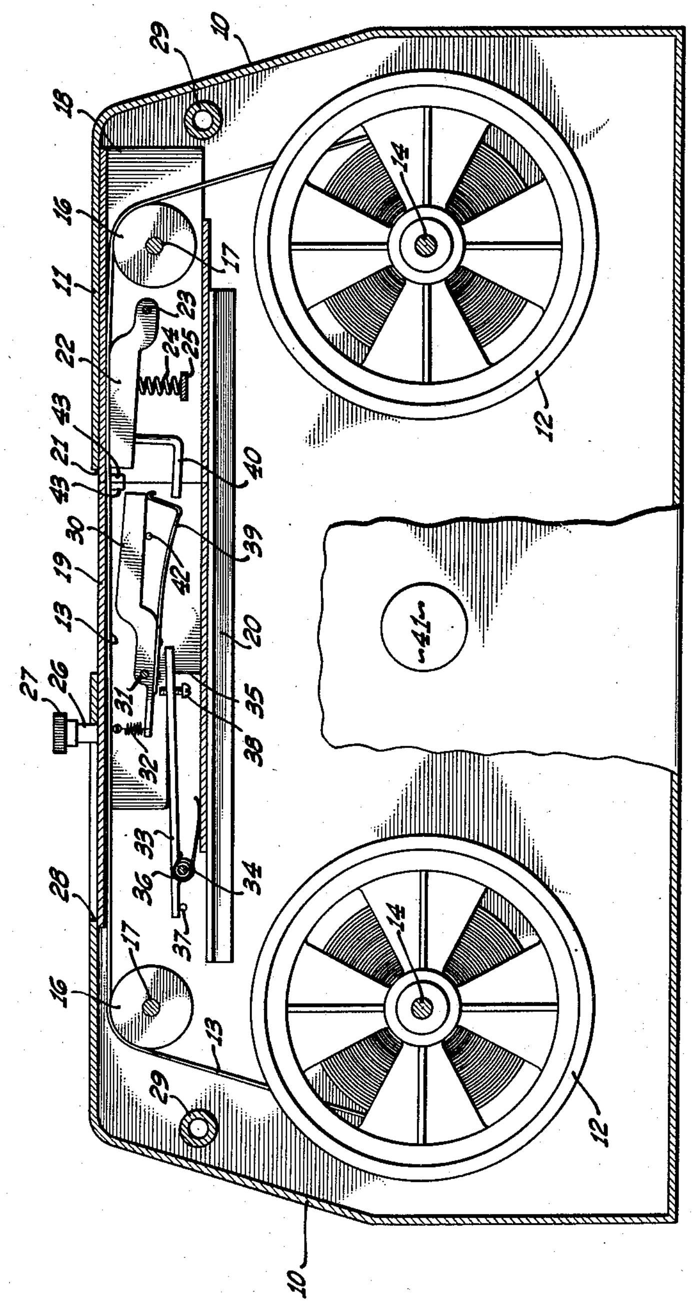
Fig. 1 is a sectional view through the magazine, illustrating one embodiment of my invention, and showing, particularly, the gate of the apparatus in closed position.
Figure 2:
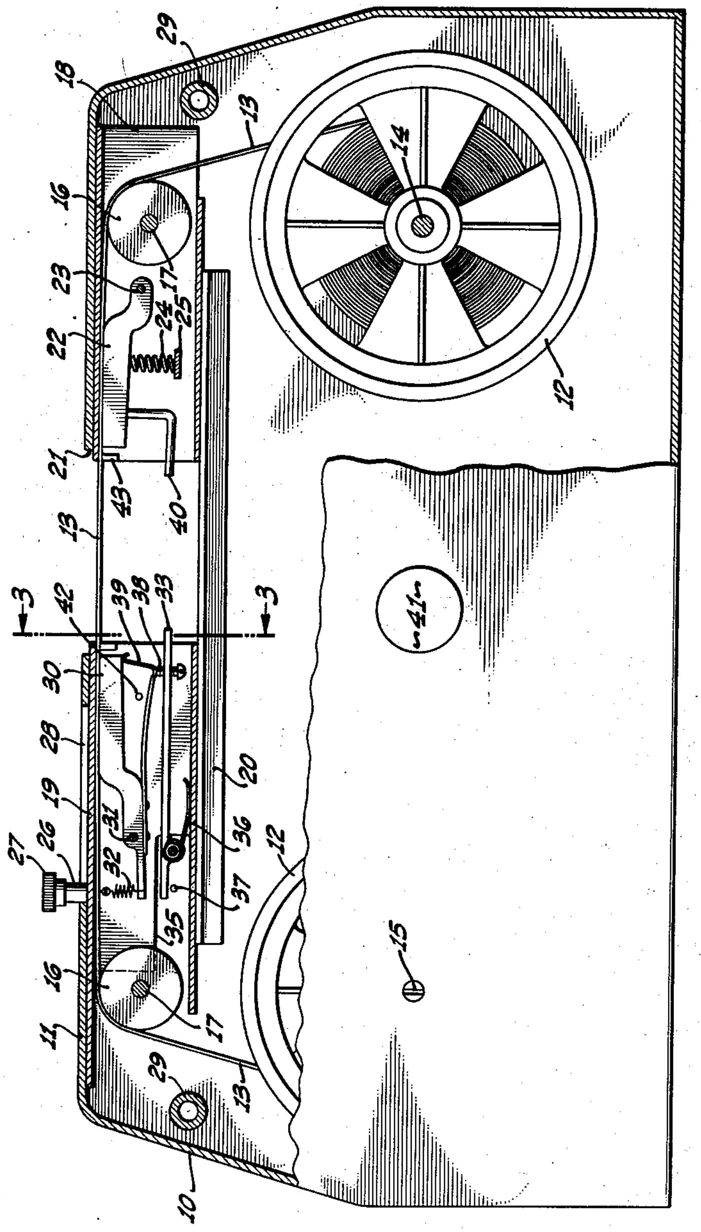
Fig. 2 is a sectional view similar to Fig. 1, illustrating the mechanism in position with the gate open.
Figure 3:
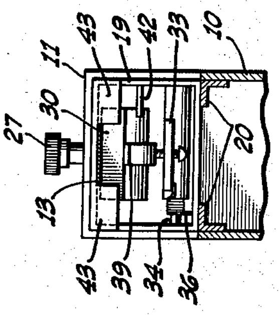
Fig. 3 is a sectional view taken on lines 3—3 of Fig. 2.

Referring to the drawings more in detail, the numerals of which indicate similar parts throughout the several views, 10 designates, in the preferred embodiment of Figs. 1 to 3, a casing having a flat top 11. The cross-sectional dimension of the casing is sufficient to accommodate a pair of flat reels 12 adapted to carry in coiled condition the magnetic recording medium which, in the embodiment illustrated, comprises a thin steel tape 13. Reels 12 are mounted at opposite ends of casing 10 upon spindles 14 journalled in bearings (not shown) carried by the opposed walls of the casing. One end of each spindle 14 is formed with a mortise 15 for operative engagement with a tenon on the end of a drive shaft of a motor (not shown) of the recording unit with which the magazine is removably associated when in use. Thus, either reel 12 may be employed as a take-up reel to draw the tape from the other reel.

The tape 13 passes over a pair of idler pulleys 16 carried rotatably adjacent the underside of top 11 at opposite ends, respectively, of the casing. One of idler pulleys 16 is journalled on a shaft 17 having its ends mounted in a stationary frame 18 of a pair of frames, 18 and 19, rectangular in cross-section and supported respectively in contiguous relation with the underside of top 11 of the casing by a pair of angle brackets 20, secured to opposite side walls of the magazine. The stationary frame 18, located at one end of casing 10, extends in the opposite direction to a point adjacent one edge of a rectangular cutout or opening 21 formed in the top 11 and adjoining side walls of casing 10 for the reception of a recording head, as is hereinafter more in detail described. The idler pulleys 16 normally support tape 13 in close proximity with the underside of the top of the two frames 18 and 19 through both of which the tape extends, with a reach of the latter projecting through the upper part of opening 21 so as to provide sufficient room below tape 13 in the opening for the accommodation of the magnets and poles which are to engage the under side of the tape. An angular pressure bar 22 is pivoted on a pin 23 in the stationary frame 18 for movement in a vertical arc, and is normally urged into contact with tape 13 by a helical compression spring 24 supported beneath bar 22 on a seat 25 carried by the frame.

The frame 19 is slidable between the angle bracket 20 therebelow and top 11 of casing 10, from a position displaced from opening 21 in the casing to a closed position abutting against the stationary frame 18. Thus, with the sliding gate 19 closed, tape 13 is completely encased and protected against fracture when not in use. The operation of gate 19 is controlled manually by means of a control pin 26 having a knurled head 27 projecting through a slot 28 in top 11 of the casing, the ends of which slot 28 correspond with the limits of movement of the gate in either direction.

Magazines of the character here contemplated are adapted to be clamped to recording apparatus, whereby the recording head, movable upon guides, may be swung through the opening 21 in the casing and releasably engage the tape. To this end, I provide a pair of parallel transverse sleeves 29 extending through opposite walls of the casing adjacent opposite ends of the latter for the accommodation of guide pins (not shown) of the recording unit. 41 indicates the knurled head of a lock screw extending through the casing and adapted to be threaded into the supporting plate (not shown) of the recording unit. When so associated with the recording unit, casing 10 is mounted with opening 21 disposed to receive the recording head.

Due to the fact that steel tape or wire of the type best suited for magnetic recording is extremely thin, there is a tendency for such media to sag, coil, or twist, unless held in taut condition. It is of course highly important that the reach of the tape adjacent opening 21 be held firmly in the same plane with respect to the recording unit each time the magazine is clamped in position, to prevent the movement of the poles of the magnetic head from breaking the tape.

In order to obviate this result, I provide a pressure bar 30, pivotally carried on a fulcrum pin 31 journalled in the opposing walls of the slidable gate frame 19. Bar 30 is normally held against a stop 42 in spaced relation with the under side of tape 13 by a tension spring 32 connecting the opposite end of bar 30 with the top of frame 19, but is movable in response to means about to be described into contact with the tape so as to urge the latter against the top of the gate frame 19. An actuating lever 33 is fulcrumed on a transverse pin 34 having its ends secured in opposing walls of the casing, and with the gate in opened position is located beneath bar 30, a portion of the frame 19 being cut away as indicated at 35 to accommodate pin 34. The end of lever 33 nearest adjacent the opening is normally held in a position slightly elevated with respect to the horizontal by means of a coiled spring 36 encircling pin 34 and engaging the lever and the bottom of the sliding frame 19. Lever 33 is limited in this movement by a stop 37, disposed beneath the opposite end of the lever, and secured to the casing. The elevated end of lever 33 projects slightly into opening 21 in the casing for a purpose hereinafter described. A screw 38 is threaded through lever 33 adjacent its elevated end to contact the under surface of a spring cam strip 39 having one end riveted or otherwise suitably secured to the under side of bar 30 adjacent the point of pivoting of the latter. Strip 39 extends toward the opening 21 in the casing in the plane of bar 30, but diverges downwardly from the bar in a wide arc, and adjacent its end is bent sharply toward the bar so as to contact the free end of the latter, normally supported by stop 37. In operation, when gate 19 is shifted from closed to open position, the spring strip 39 is moved into contact with the upper end of screw 38, properly adjusted. Downward displacement of screw 38 is resisted by coil spring 36, and accordingly bar 30 and strip 39 are swung upwardly into contact with tape 13 as the curved portion of the strip rides upon the upper end of screw 38. With proper adjustment of the screw and proportioning of the length of the spring strip relative to the degree of movement of gate 19, the contact of the bar with tape 13 occurs as the gate nears fully opened position. It will be understood that as the coiled spring 36 is of greater strength than the spring 32, the tension of the latter is overcome in effecting the operation just described.

It will thus be seen that the bars 22 and 30 cooperate in urging tape 13 into a plane parallel and adjacent the undersurface of the top of the respective frames 18 and 19, and further that the final opening movement of gate 19 results in dragging bar 30 in frictional contact with the tape. As the portion of tape 13 at the opposite side of opening 21 from gate 19 is normally held against longitudinal movement by the engagement of bar 22 therewith, the frictional drag on the tape by bar 30 at the conclusion of the opening movement of the gate is effective to draw taut the reach of the tape extending opposite opening 21, thus assuring that the reach of the tape lies entirely in a plane interposed between parallel planes in which the pole pieces are suspended by the recording unit, whereupon the latter may be swung into position at either side of the tape for release thereagainst.

In order to ssure unrestricted movement of the tape between the pole pieces of the energized magnets during operation of the assembly, I provide mechanism for displacing bars 22 and 30 from tape 13. To this end, an angle bracket 40 is secured rigidly to the free end of bar 22, having a leg which projects laterally into opening 21 in the casing. As hereinabove generally alluded to, the actuating lever 33 is of a length to project into opening 21 at the opposite side of and at the same level as the leg of angle bracket 40. A pair of upwardly curved pins (not shown), rigidly connected in spaced relation, are adapted to extend into opening 21 with their outer ends disposed slightly above bracket 40 and lever 33 when the members 22 and 30 are engaged with the tape. As the casing is assembled with the recording unit, the intermediate reaches of the undersurfaces of the pins are projected into contact with the upper surfaces of lever 33 and bracket 40, respectively, so as to depress the bar 22 downwardly from contact with the tape against the tension of spring 24 and correspondingly release pressure against the spring strip 39 connected with bar 30, whereby the helical spring 32 may lower bar 30 against its stop 42. In the preferred embodiment, these pins are integral parts of the recording head assembly, and are engageable with the bracket and lever, respectively, immediately after the poles of the recording heads come in contact with opposite sides of the tape. Removal of a recording assembly so constructed from the opening in the casing withdraws the pins and permits the springs 24 and 36 to return the bars 22 and 30 against tape 13. The operator may then close gate 19 for the protection of the tape and the record impressed thereon. It will be observed that initial closing movement of gate 19 will displace the end of the spring strip 39 from screw 38 whereupon the tension of spring 32 draws the bar 22 from contact with the tape and thereby obviates any tendency of the friction of bar 22 to cause buckling of the tape which might otherwise result in its fracture. In order to prevent premature operation of the apparatus incident to inadvertent energization of the motor of the recording unit, a normally open switch (not shown) adapted to be closed by the movement of the pins, magnets or pole pieces into operative position, and arranged in the circuit to the motor, may be provided, the construction and operation of which being understood by those engaged in the art without specific illustration. 43 indicates each of a pair of depending guides integral with the ends of frames 18 and 19 at opposite sides of opening 21 in the casing to resist lateral displacement of the tape when the gate is open.

Figure 4:
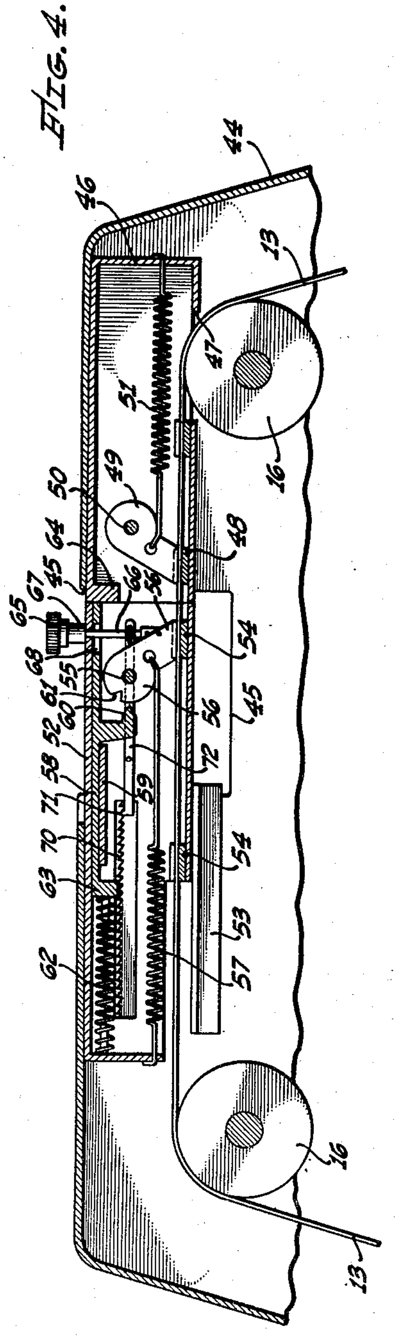
Fig. 4 is a broken section through a magazine, illustrating a modified form of my invention.
Figures 5, 6:
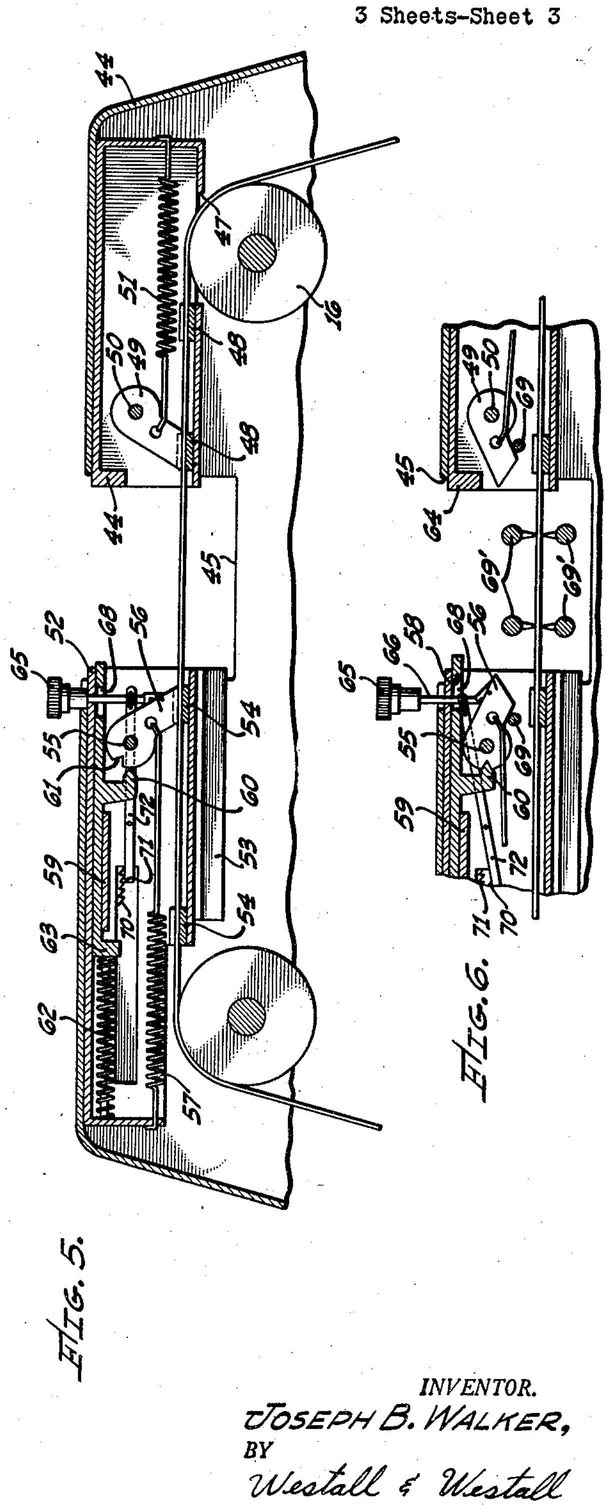
Fig. 5 is a sectional view of the embodiment of the gate illustrated in Fig. 4 in open position.
Fig. 6 is a broken sectional view through the open gate, depicting the tape pressure elements in elevated or inoperative position, and the pole pieces of a recording head positioned in contact with the tape ready for recordation, erasing or transcription of a magnetic record.

In the embodiment of my invention illustrated in Figs. 4–6 inclusive, I provide a casing 44 of the same general contour as casing 10 for housing reels 12. An opening 45 through the side walls and the top of casing 44 for the accommodation of the recording head is somewhat deeper in this embodiment, as the reach of tape 13 supported adjacent this opening 45 is carried at a lower level by the idler pulleys 16. The stationary frame 46 secured in the casing at one side of opening 45 and in contiguous relation with the top of the casing is formed with a cut-out 47 to accommodate the upper arc of the adjacent pulley. Tape 13 extends from pulley 16 closely adjacent the bottom of frame 46, passing over a pair of guide brackets 48 having upstanding extensions at either end to resist lateral movement of the tape while in operation. A dog 49 pivotally carried on a pin 50 mounted in opposing side walls of the frame, is formed with a beveled end adapted to be urged into contact with the tape at the point at which the latter passes over one of guide brackets 48. Dog 49 is actuated resiliently in response to a tension spring 51 connected between the dog and the end of frame 46.

A gate 52, comprising a frame rectangular in cross-section is slidably supported on short angles 53 at the opposite side of opening 45 in casing 44 from frame 46, to substantially close the opening and protect tape 13 which extends therethrough. 54 indicates a pair of guide brackets identical to brackets 48 supported on the floor of the frame for the support and guidance of the tape. A transverse pin 55 is mounted in opposed side walls of frame 52 adjacent the forward end of the latter for the pivotal support of a dog 56 adapted to bear on the upper surface of the tape at a point where it passes over one of brackets 54, in response to the tension of a spring 57 connected to the opposite end of frame 52. A slide 58 is reciprocably supported within frame 52 against the top thereof on a cross plate 59 secured to opposite sides of the frame. Depending from slide 58 is a pawl 60 having a laterally projecting point adapted to be shifted with slide 58 into engagement in a notch 61 formed in the hub of dog 56 in response to the urge of a compression spring 62 interposed between the end of gate 52 and a depending lug 63 carried by the slide. The reciprocable movement of slide 58 relative to gate frame 52 is limited by the abutment of the edges of plate 59 against lug 63 and pawl 60, respectively. This movement is sufficient to permit pawl 60 to move into and out of engagement with notch 61 in dog 56 under appropriate conditions, about to be described. As is indicated in Fig. 6, with the gate open and pawl 60 engaged in notch 61 of the dog, slide 58 projects into opening 45 slightly beyond the adjacent end of frame 52 in response to the urge of spring 62. Accordingly, when the gate is closed the slide abuts against a stop 64 depending from the opposing end of stationary frame 46 at the opposite side of opening 45, causing the slide 58 to shift rearwardly slightly into alignment with end of frame 52 against the compressive urge of spring 62 so as to disengage pawl 60 from dog 56 and permit spring 57 to draw the dog downwardly against tape 13. A spring-pressed latching device (not shown) of conventional construction may be incorporated in the apparatus to normally maintain the gate closed.

Gate 52 may be opened when desired by manual manipulation of a knurled knob 65 carried on the end of a control rod 66, projecting through the top of the foremost end of gate 52. A slot 68 is provided in slide 58 through which rod 66 extends, so as not to interfere with the reciprocable movement of the slide, as hereinabove described. The lower end of the rod is pivotally connected to dog 56 for a purpose hereinafter alluded to.

Thus with the gate closed, both dogs 49 and 56 engage tape 13 in response to the urge of the springs 51 and 57. Moreover, both dogs remain in contact with the tape as gate 52 is opened, so as to draw the tape taut and thereby facilitate engagement of the recording head and, particularly, position the pole pieces in contact with opposite sides of the tape as hereinabove referred to in reference to the embodiment of Figs. 1 to 3 inclusive. It will be observed, however, from reference to Fig. 5 that the opening of the gate permits springs 62 to project slide 58 forwardly and pawl 60 into contact with the peripheral edge of the hub of dog 56 at a point below the notch 61. When the gate is opened, the dogs 49 and 56 are so arranged with respect to the opening that they may be engaged and lifted from contact with tape 13 by a pair of downwardly curved pins 69, comprising a part of the recording head assembly, as indicated in Fig. 6. The ends of pins 69 are disposed to project slightly below the respective dogs when the casing is arranged for assembly with the recording unit. Movement of the casing into operative relationship with the unit thus projects the pins beneath the dogs causing the latter to ride up onto the pins so as to displace the dogs from the tape coincident with final adjustment of the casing. The elevation of the dog 56 is effective to align notch 61 with pawl 60 which is engaged therein under pressure of spring 62. With the recording head in position, tape 13 may accordingly be moved freely through the opening between pole pieces 69′ for recording, erasing, or transcribing a record thereon.

Removal of the recording head from opening 45 in casing 44 likewise removes the pins 69 from under the dogs, and dog 49 is permitted to return to a position bearing against the tape in response to tension of spring 51. However, pawl 60 engaged in notch 61 of dog 56 resists the tension of spring 57 and maintains dog 56 in an elevated position, enabling closure of the gate 52 without injury to the tape. Abutment of the end of slide 58 against the depending stop 64 of stationary frame 46 at the conclusion of the closing movement of gate 52 displaces pawl 60 from notch 61 in dog 56 and permits the return of the dog against the tape to complete the cycle of operation, whereupon the parts will have been returned to original positions, as illustrated in Fig. 4.

If gate 52 is opened, either completely or partially, without the insertion of the recording head and the pins 69, it will be observed that pawl 60 will not have been engaged with dog 56, and the latter will remain in contact with tape 13. Accordingly, in order to enable the operator to open the gate, either for purposes of inspection or otherwise, and again close it without the insertion of the recording head into the opening in the casing, dog 56 may be elevated from the tape by lifting the rod 66 manually to a degree sufficient to engage pawl 60 in notch 61 of the dog. Should gate 52 be inadvertently closed without releasing dog 56, there would be a tendency to buckle the tape. Accordingly, I provide a ratchet 70 rigidly attached to the side of casing 44, which projects through a cut-out in the gate frame. A pawl 71, carried on the end of a lever 72 fulcrumed in the frame, is adapted to engage the teeth of ratchet 70 when dog 56 is in tape-contacting position, and ride freely over the ratchet as gate 52 is opened, but prevent closing movement of the gate. The opposite end of lever 72 is connected to control rod 66 whereby elevation of the control rod is effective to disengage pawl 71 from ratchet 70. Thus, while the pawl and ratchet do not restrict opening of the gate, movement in the opposite direction is prevented as long as dog 56 engages the tape.

It will thus be seen that I have provided a magazine for permanently housing a pair of reels carrying a length of tape or wire with which a magnetic recording, erasing or transcribing unit may be operatively associated by insertion through an opening in the magazine so as to obviate the necessity of removing the reels from the magazine or rewinding the tape upon separate reels, and further that the apparatus includes a gate for the opening in the magazine adapted to normally complete the protective encasement of the record medium when not in operation, incorporating mechanism for supporting, guiding, and for drawing the tape or wire taut in a position most conducive to facile assembly and utility with a recorder or a transcriber. In the claims the term "tape" is used to designate any flexible element, such as steel wire, capable of use as a magnetic recording medium.

While I have shown and described but two embodiments of my invention, it will be understood that numerous changes may be made in size, shape, design and number of the various parts, that the casing is merely illustrative of a device for housing the reels, tape and associated mechanism, that only one wall of the casing may be cut away to provide an opening in but one side of the magazine for the reception of the recording head, and that such opening may be provided in any part of the casing in order to adapt the magazine to recording and transcribing units of different types, suitable pulleys being provided to direct the tape adjacent such opening, and that the various features of my invention, while interdependent in the complete assembly, may be utilized independently, without departing from the scope of my invention as defined in the appended claims.

What I claim and desire to secure by Letters Patent is:

1. In a device of the character described, a casing having an opening therein, means including a pair of reels within the casing to support and move a length of tape adjacent said opening, a gate comprising a frame telescoped over said tape and slidable to and from a position opposite said opening to enclose the length of tape at said opening in a protective sheath, and means, operable in response to movement of said gate from closed position toward open position, to draw said length of tape taut.

2. In a device of the character described, a casing having an opening therein, means including a pair of reels to support and move a length of tape adjacent said opening for engagement by a recording head of a magnetic recording unit, guide means for said tape at opposite sides of said opening, separable spring-pressed means to urge reaches of said tape at opposite sides of the opening against said guide means, releasing means to displace said last-named means from said tape to permit the latter to be moved freely from reel to reel, a gate movable into said opening to substantially close the latter, and means to prevent closing movement of said gate while said spring-pressed means are operatively engaged with said tape.

3. In a device of the character described, a casing having an opening therein, means including a pair of reels within the casing to support and move a length of tape adjacent said opening, a gate comprising a frame telescoped over said tape and slidable to and from a position opposite said opening to enclose the length of tape at said opening in a protective sheath, and means, operable in response to movement of said gate from closed toward open position, to apply tension to the reach of said tape opposite the opening.

JOSEPH B. WALKER.

REFERENCES CITED

The following references are of record in the file of this patent:

UNITED STATES PATENTS

| Number | Name | Date |
|---|---|---|
| 1,665,784 | Hornauer | Apr. 10, 1928 |
| 1,782,529 | De Vinna | Nov. 25, 1930 |
| 2,173,996 | Becker | Sept. 26, 1939 |
| 2,175,538 | Morsbach et al. | Oct. 10, 1939 |
| 2,319,530 | Bolsey | May 18, 1943 |
| 2,391,497 | Wilson et al. | Dec. 25, 1945 |

FOREIGN PATENTS

| Number | Country | Date |
|---|---|---|
| 633,160 | Germany | July 21, 1936 |